SIGNAL DISTORTION DETECTION BY SAMPLING DIGITAL DIPHASE SIGNALS AT TWICE THE BIT REPETITION RATE
Filed June 21, 1963 4 Sheets-Sheet 1

INVENTORS
GEORGE J. MESLENER &
CHARLES R. ATZENBECK
BY
Edward J. Norton
Attorney INVENTORS
GEORGE J. MESLENER &
BY CHARLES R. ATZENBECK
Edward J. Norton
Attorney INVENTORS
GEORGE J. MESLENER &
CHARLES R. ATZENBECK
BY Edward J. Norton
Attorney INVENTORS
GEORGE J. MESLENER &
BY CHARLES R. ATZENBECK
Edward J. Norton
Attorney 3,335,224

SIGNAL DISTORTION DETECTION BY SAMPLING DIGITAL DIPHASE SIGNALS AT TWICE THE BIT REPETITION RATE

George John Meslener, New York, N.Y., and Charles Richard Atzenbeck, Cranford, N.J., assignors to Radio Corporation of America, a corporation of Delaware Filed June 21, 1963, Ser. No. 289,514
16 Claims. (Cl. 178—88)

This invention relates to distortion detection circuits for data signals and, particularly, to an improved circuit in which digital techniques are used to detect objectionable distortion in a differential phase shift keyed data signal.

In the transmission of intelligence by means of a data signal, the data signal is typically divided into time periods or bit intervals. In an elementary form, the signal remains at one level for the duration of a bit interval to indicate a first signal condition with the signal remaining at a second level for the duration of a bit interval to indicate a second signal condition. The first signal condition is usually defined as a mark or "1," while the second signal condition is defined as space or "0." The signal is shifted between the two levels in succeeding bit intervals according to the intelligence to be transmitted. A data signal of this type is referred to as an NRZ (non-return-to-zero) data signal.

In processing an NRZ data signal for transmission over a communication path, for example, a telephone line or cable, some type of modulated data transmission system is used. One class of modulated data transmission systems now in use includes the differential phase shift keyed or PSK systems. In one form, the differential PSK system includes an arrangement in which a symmetrical square wave is provided having a repetition rate equal to the data bit rate of the NRZ data signal. The square wave is modulated by the NRZ data signal so that the phase of the square wave is reversed every time one of the signal conditions, for example, mark or "1," is to be transmitted. The second signal condition, for example, space or "0," is represented by no change in the phase of the square wave. A data signal is produced by reversing the phase of the square wave at the point where the transition of the carrier square wave would otherwise occur for each mark or "1" bit interval transmitted. The resulting modulated square wave is referred to as a digital diphase data signal.

In forwarding a digital diphase data signal produced in the manner described over a communication path, the presence of noise on the path serves to distort the data signal. In recovering the original intelligence from the digital diphase data signal, the presence of noise voltage which is equal to or greater than the received signal and of the opposite polarity at the time of signal detection results in the introduction of errors in the demodulated signal. In a typical application, a large percentage of the distortion present in the received signal takes the form of signal half-bit mutilations. The distortion serves to reverse the polarity of either the first half or the second half of a bit interval, resulting in the erroneous detection of the intelligence represented by that bit interval.

Some type of arrangement in the operation of a data transmission system for detecting the errors present in the recovered intelligence due to distortion introduced in the received data signal is highly desirable.

Various signal distortion detection schemes have been proposed involving the use of redundancy of coding in the transmitted data signal. Such redundancy may take the form of repetitive transmission of bit intervals or the insertion of parity and/or other types of check bits in the data signal. The use of redundancy lowers the data rate of a fixed bandwidth system. If the data rate is fixed, an increase in bandwidth results. Equipment is provided at the transmit end to insert the redundancy in the form of duplicate bit intervals or check bits and at the receive end to process the added bit intervals and remove them where necessary. Where parity check bits are employed, the received signal are demodulated and the data bits assembled into groups for comparison with the parity information.

It is an object of the invention to provide an improved circuit arrangement for detecting distortion in a data signal.

A further object is to provide an improved circuit arrangement using digital techniques to detect distortion in a differential phase shift keyed data signal without the use of redundancy in the data signal or an increase of bandwidth.

Another object is to provide an improved circuit arrangement for detecting distortion in a digital diphase data signal using digital techniques.

In analyzing a digital diphase data signal as produced by a differential phase shift keyed system, it can be shown that, if a bit interval in the data signal is redefined as beginning at the center of the conventional bit interval and ending at the center of the following conventional bit interval, the data signal when free of distortion always includes a change in polarity between succeeding ones of the redefined bit intervals. When distortion is introduced in the digital diphase data signal in the form of single half-bit mutilations due to noise or other effects, the presence of the distortion in the data signal results in the absence of a change in polarity between the redefined bit interval including the half-bit mutilation and the neighboring redefined bit interval, thereby introducing an error in the intelligence recoverable from the data signal.

Briefly, in the embodiment of the invention described herein, a digital diphase data signal received over the communication path of a differential PSK system and including distortion in the form of single half-bit mutilations is sampled at a rate equal to at least twice the data bit rate. The samples of the data signal are stored. By way of example, a shift register can be used to perform both the sampling and storage function. The samples are then examined by means of a gating or similar circuit according to their appearance in the above described redefined bit intervals to recover the original intelligence from the received data signal. At the same time, the samples are examined by the gating circuit for a given pattern which indicates that a change in polarity has not taken place between succeeding ones of the redefined bit intervals. Upon the given pattern being recognized, an error output signal is produced, indicating that the intelligence recovered from the received digital diphase data signal at that time is in error. Suitable means may be made responsive to the error output signal to originate correction procedures or simply to alert the terminal equipment to the existence of the error. The detection of distortion in the data signal is performed using only digital techniques and without any redundancy in the data signal.

A more detailed description of the invention will now be given in connection with the accompanying drawing, in which.

Figure 1:
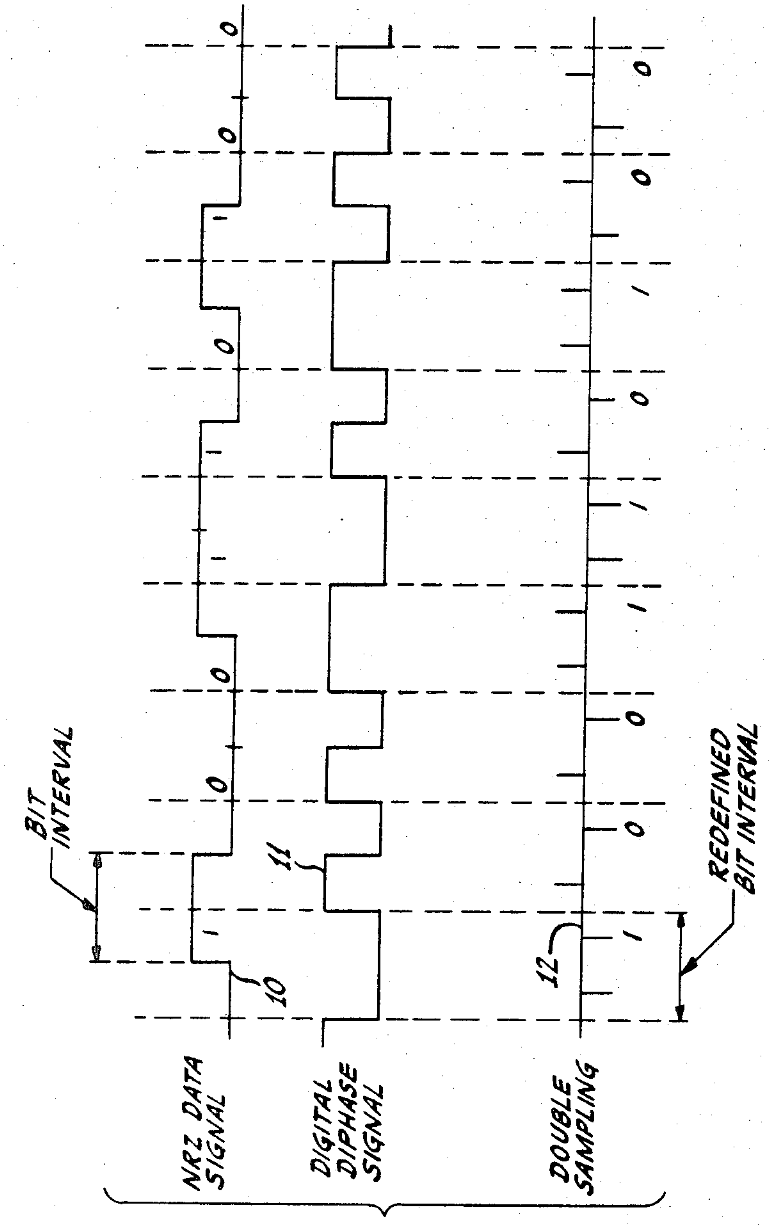
FIGURE 1 is a series of waveforms illustrating the make-up of a typical digital diphase data signal with which the present invention may be employed.

*FIG. 1 waveforms*

A typical non-return-to-zero or NRZ data signal is shown in waveform 10 of FIG. 1. The NRZ data signal 10 is shown as being divided into equal length time periods or bit intervals. The level of the data signal 10 is high for the duration of each bit interval respresenting a "1" signal condition with the level of the data signal 10 being low for the duration of each bit interval representing a "0" signal condition. Reading from left to right, the data signal 10 has the pattern 100110100.

A digital diphase data signal as derived from the NRZ data signal 10 is shown in waveform 11 of FIG. 1. The digital diphase signal 11 consists essentially of a square wave having a repetition rate equal to the data bit rate of the NRZ signal 10. The phase of the square wave is reversed for each "1" signal condition to be transmitted. No reversal in phase takes place for each "0" signal condition to be transmitted. A detailed discussion of a digital diphase signal including an example of equipment involved in the production of such a signal is found in an article by G. Aaronson, D. Douglas and G. Meslener, entitled "A New Digital Communcations System-Modified Diphase," and appearing in the 1961 IRE-PGME 5th National Convention Record.

If the bit interval in the digital diphase signal 11 is redefined as beginning at the center of the conventional bit interval in the NRZ signal 10 and ending at the center of the next conventional bit interval in the NRZ signal 10, an examination of the digital diphase signal 11 shows that a change in polarity takes place between each succeeding ones of the redefined bit intervals. This is true regardless of the intelligence carried by the succeeding bit intervals. The change in polarity can be in either direction but a change in polarity always takes place. If the digital diphase signal 11 is now sampled at twice the data bit rate, a series of sample pulses results as shown in waveform 12 of FIG. 1. Two sample pulses of the same polarity are produced for each redefined bit interval representing a "1" signal condition in the digital diphase signal 11. Two sample pulses of opposite polarity are produced for each redefined bit interval representing a "0" signal condition in the digital diphase signal 11.

It can be seen from the sample pulses in waveform 12 that the second sample pulse in one redefined bit interval is always of the opposite polarity to the first sample pulse in the next redefined bit interval. A change in polarity always takes place between the redefined bit intervals. It is to be noted that even where two succeeding redefined bit intervals in the digital diphase signal 11 both represent a "1" signal condition, the two sample pulses in waveform 12 derived from the first of the redefined bit intervals while the same polarity are of the opposite polarity to the two sample pulses derived from the following redefined bit interval. On the basis of what has been said so far about the digital diphase signal 11 and the sample pulses of waveform 12 derived therefrom, one might conclude that, since no more than two sample pulses of the same polarity occur in sequence, it is possible to detect distortion in the digital diphase signal 11 by examining the sample pulses of waveform 12 for three or more sample pulses in sequence of the same polarity. The fallacy of such a conclusion is shown in the waveforms of FIG. 2.

Figure 2:
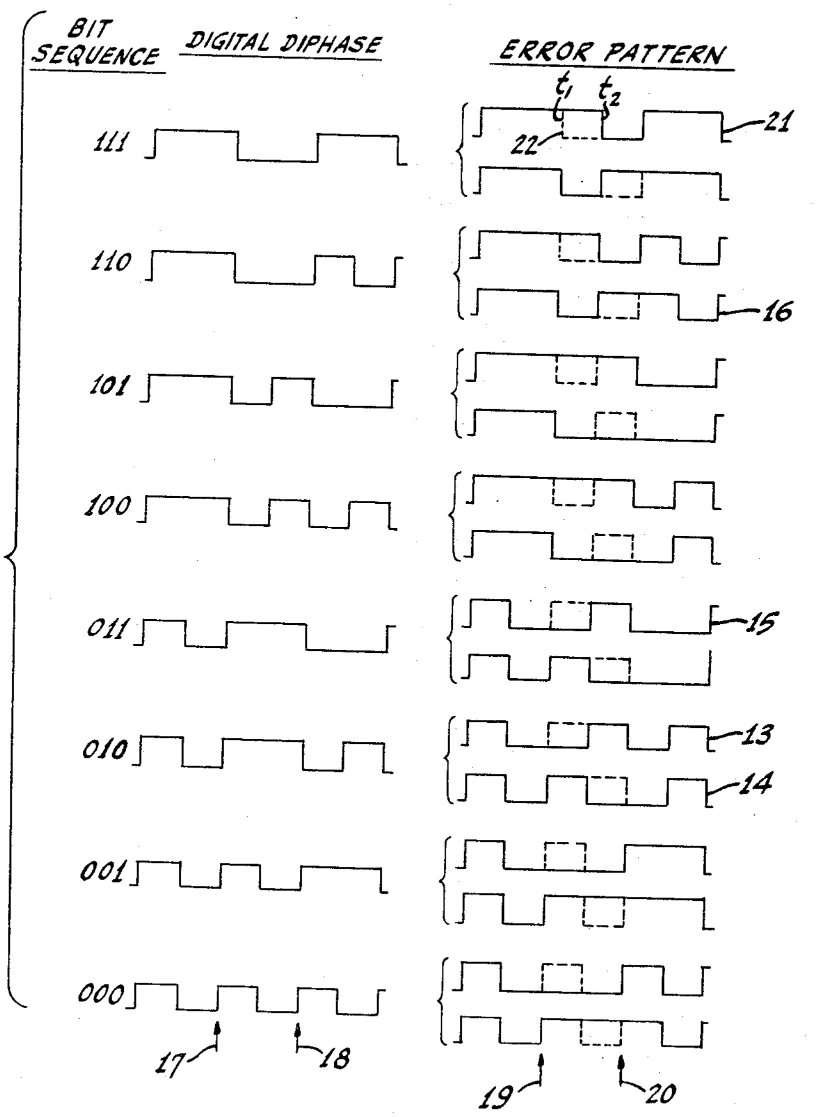
FIGURE 2 is a series of waveforms showing various error patterns which may appear in a digital diphase data signal due to the presence of single half-bit mutilations.

*FIG. 2 patterns*

FIG. 2 includes three columns. The first column to the left lists the various sequences or patterns of three bit intervals that can occur in the digital diphase signal; namely, 111, 110, 101, 100, 011, 010, 001, and 000. The second column shows the sequence of bit intervals in a digital diphase signal corresponding to each of the respective bit sequences. The third column presents the error patterns in the digital diphase signal for each of the bit sequences resulting from the occurrence of a single half-bit mutilation due to noise or other effects in the center one of the three redefined bit intervals. Two error patterns are shown for each bit sequence. The top one of the error patterns for each bit sequence represents the case when the half-bit mutilation occurs during the first half of the redefined bit interval, the lower one of the two error patterns for each bit sequence representing the case when the half-bit mutilation occurs during the second half of the redefined bit interval. The correct pattern for the digital diphase signal is indicated in each of the error patterns by dotted lines. While the error patterns have been squared for neatness and ease of drawing, the distorted portions of the signals are likely, in practice, to extend in an irregular manner for somewhat more than one-half the redefined bit interval or for somewhat less than one-half the redefined bit interval.

Assuming that the digital diphase signals as represented by the respective error patterns shown in FIG. 2 are each sampled at twice the data bit rate in the manner shown in FIG. 1, an examination of the error patterns reveals that, in fact, for a majority of the error patterns three or more sequentially appearing sample pulses of the same polarity will be produced. However, this is not always the case. For example, in the case of the bit sequence 010, the occurrence of a single half-bit mutilation in the center one of the three redefined bit intervals results in either one of the two error patterns 13, 14 shown in FIG. 2. In both of the error patterns 13, 14 only two sequentially appearing pulses of the same polarity are produced. The same situation exists for the upper error pattern 15 of the bit sequence 011 and for the lower error pattern 16 of the bit sequence 110. Something further than merely counting sequentially appearing sample pulses of the same polarity must be done in order to provide the satisfactory detection of distortion occurring in a digital diphase signal.

It has been pointed out in connection with the waveforms of FIG. 1 that, where no distortion is present in a digital diphase signal, a change in polarity always occurs between succeeding ones of the redefined bit intervals. This is further illustrated by the arrows 17, 18 in FIG. 2 which mark the boundaries of the redefined bit intervals included in the respective digital diphase signals corresponding to the listed bit sequences. Regardless of the order in which the "1" and "0" signal conditions appear, succeeding ones of the redefined bit intervals are always set apart by a change or transient in the polarity of the digital diphase signal. The arrows 19 and 20 associated with the error patterns to the right of FIG. 2 again mark the boundaries of the redefined bit intervals in the respective digital diphase signals.

Relating the arrows 19 and 20 to the error patterns shows that the presence of the half-bit mutilation causes in every case the removal of a change in polarity which would otherwise take place between succeeding ones of the redefined bit intervals. By way of example, in the topmost one of the error patterns 21 shown in FIG. 2, a change in polarity should take place at time $t_1$ corresponding to the arrow 19 as indicated by the dotted lines 22. As a result of the half-bit mutilation, the change of polarity does not take place until time $t_2$ or the center of the second one of the redefined bit intervals.

An examination of the remaining error pattern reveals that, where the half-bit mutilation occurs during the first half of the center one of the redefined bit intervals, the change is polarity which should occur between the first and second redefined bit intervals is removed or otherwise destroyed. Where the half-bit multilation occurs in the second half of the center one of the redefined bit intervals, the change in polarity which should occur between the second and third redefined bit intervals is removed. Regardless of the particular error pattern introduced in the digital diphase signal by the occurrence of a half-bit mutilation, the existence of the half-bit mutilation results in the absence of a change in polarity which otherwise takes place. The loss of a transition occurs for every half-bit mutilation pattern as long as the mutilated half-bits are separated by at least one non-mutilated half-bit. By determining the presence or absence of a change in polarity between succeeding ones of the bit intervals in a digital diphase signal and defined in the above manner, it is possible to detect distortion in the form of a single half-bit mutilations present in the digital diphase signal and, therefore, to determine the likelihood of errors in the intelligence recovered from the digital diphase signal.

Figure 3:
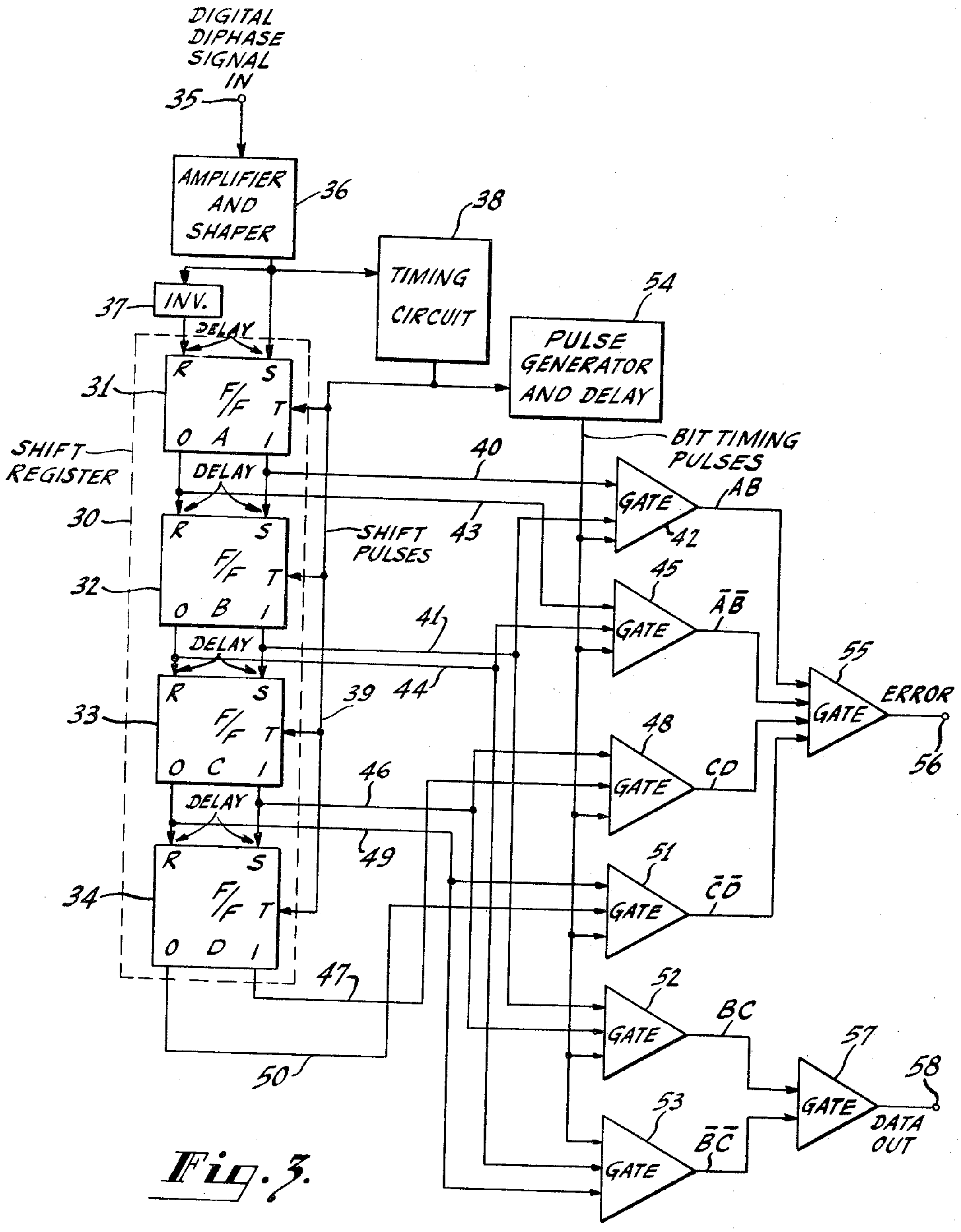
FIGURE 3 is a block diagram of one embodiment of a data signal distortion detection circuit constructed according to the invention.

*FIG. 3 detailed description*

FIGURE 3 is a block diagram of one embodiment of a data signal distortion detection circuit constructed according to the invention. All ground symbols and common return paths are omitted in the block diagram of FIG. 3 in order to simplify the drawing. Such connections are provided in the customary manner. A shift register 30 is shown including four steerable flip-flop stages 31, 32, 33, and 34. The flip-flops 31, 32, 33, and 34 may be of any known construction and are defined as a circuit having two stable states or conditions, set and reset respectively. Three input terminals are provided for the circuit which are designated as set S, reset R and trigger T. Two outputs are associated with the flip-flop circuit which are given the Boolean tags of One and Zero. If the flip-flop is in its set condition, the One output terminal voltage is high and the Zero output terminal voltage is low. If the flip-flop is in its reset condition, the One output terminal voltage is low and the Zero output terminal voltage is high. The four flip-flops 31, 32, 33, and 34 are all of similar construction with each flip-flop operating in the manner described.

A shift pulse applied to the trigger input terminal T of the flip-flop circuit causes the flip-flop to assume its set condition if the set input terminal S voltage is high and the reset input terminal R voltage is low at the time of the shift pulse. The flip-flop assumes its reset condition when the reset input terminal R voltage is high and the set input terminal S voltage is low at the time of the shift pulse. By way of example, the flip-flops 31, 32, 33, and 34 may be constructed in the manner shown on page 160, General Electric Transistor Manual, sixth edition, published by the General Electric Company.

A digital diphase signal including distortion in the form of single half-bit mutilations and received over a communication path is applied to an input terminal 35. The received data signal may have been originally generated according to the techniques outlined in the above-referenced article by G. Aaronson, D. Douglas and G. Meslener or by any other suitable signal generating arrangement. The communication path may include a telephone line, a cable or a radio path. Magnetic or other recording means may be included in the communication path.

The received data signal is applied from the input terminal 35 to an amplifier and shaper circuit 36. The amplifier and shaper circuit 36 serves to square as well as to amplify the incoming data signal. The data signal is fed from the amplifier and shaper circuit 36 to the set input terminal S of the first flip-flop 31 and through an inverter 37 to the reset input terminal R of the first flip-flop 31. The One output terminal of the first flip-flop 31 is connected to the set input terminal S of the second flip-flop 32 with the Zero output terminal of the first flip-flop 31 being connected to the reset input terminal R of the second flip-flop 32. The One output terminal of the second flip-flop 32 is connected to the set input terminal S of the third flip-flop 33, the Zero output terminal of the second flip-flop 32 being connected to the reset input terminal R of the third flip-flop 33. The One output terminal of the third flip-flop 33 is connected to the set input terminal S of the fourth flip-flop 34 with the Zero output terminal of the third flip-flop 33 being connected to the reset input terminal R of the fourth flip-flop 34.

The received data signal is also fed from the amplifier and shaper circuit 36 to a timing circuit 38. The timing circuit 38 is responsive to the received data signal to produce a train of shift pulses occurring at twice the received data bit rate. The shift pulses generated by the timing circuit 38 are applied to the trigger input terminals T of the four flip-flops 31, 32, 33, and 34 in the shift register 30 over a lead 39.

The one output terminal of the first flip-flop 31 and the One output terminal of the second flip-flop 32 are connected over leads 40 and 41, respectively, to a gate circuit 42. The Zero output terminal of the first flip-flop 31 and the Zero output terminal of the second flip-flop 32 are connected over leads 43 and 44, respectively, to a second gate circuit 45. The One output terminal of the third flip-flop 33 and the One output terminal of the fourth flip-flop 34 are connected over leads 46 and 47, respectively, to a third gate circuit 48. The Zero output terminal of the third flip-flop 33 and the Zero output terminal of the fourth flip-flop 34 are connected over leads 49 and 50, respectively, to a fourth gate circuit 51.

The One output terminal of the second flip-flop 32 and the One output terminal of the third flip-flop 33 are also connected over leads 41 and 46, respectively, to a fifth gate circuit 52. The Zero output terminal of the second flip-flop 32 and the Zero output terminal of the third flip-flop 33 are connected over leads 44 and 49, respectively, to a sixth gate circuit 53. The shift pulses generated by the timing circuit 38, in addition to being applied to the trigger input terminals T of the flip-flops 31, 32, 33, and 34, are applied to a pulse generator and delay circuit 54. The pulse generator and delay circuit 54 acts to produce a train of bit timing pulses ccurring substantially at a repetition rate equal to the received data bit rate. The bit timing pulses are applied from the pulse generator and delay circuit 54 to the six gate circuits 42, 45, 48, 51, 52, and 53.

The gate circuits 42, 45, 48, 51, 52, and 53 are of similar construction and may be a known arrangement of unidirectional current conducting devices, for example, crystal diodes, poled so that an output pulse is produced by the gate circuit when and only when a given pattern or arrangement of voltage levels appears at the respective inputs to the gate circuit. The outputs of the four gate circuits 42, 45, 48, and 51, which constitute a logic circuit for detecting the distortion in the received data signal, are all connected to an OR gate circuit 55. The output of the OR gate circuit 55 is connected to an output terminal 56. The outputs of the remaining two gate circuits 52 and 53, which act as a logic circuit for recovering intelligence from the received data signal, are connected to a second OR gate circuit 57. The output of the second OR gate circuit 57 is connected to an output terminal 58.

Designating the samples of the bit intervals in the received digital diphase signal stored by the flip-flops 31, 32, 33, and 34 as A, B, C, and D, respectively, the output of the gate circuit 42 may be represented by the logic designation AB. The output of the second gate circuit 45 is represented by the designation $\overline{AB}$; the output of the third gate circuit 48 is represented by the logic designation CD; the output of the fourth gate circuit 51 is designated by the logic designation $\overline{CD}$; the output of the fifth gate circuit 52 is designated by the logic designation BC; and the output of the sixth gate circuit 53 is designated by the logic designation $\overline{BC}$.

In describing the operation of the embodiment shown in FIG. 3, reference will be made to the waveforms shown in FIG. 4. A typical digital diphase signal as received via the input terminal 35 and the amplifier and shaper circuit 36 of FIG. 3 is shown in the first waveform 65 of FIG. 4. The digital diphase signal 65 is assumed to have been originally generated with the data pattern reading from left to right of 01011100. The second and sixth redefined bit intervals, 77 and 80 respectively, both corresponding to a "1" signal condition, are shown as having been distorted by the occurrence of a single half-bit mutilation. The correct pattern of the digital diphase signal 65 for the distorted bit intervals 77 and 80 is indicated by the dotted lines.

The digital diphase signal 65 is fed to the timing circuit 38. The timing circuit 38, which may be constructed and operated in the manner outlined in the above-referenced article by G. Aaronson, D. Douglas and G. Meslener, generates a train of shift pulses having a repetition rate so that a shift pulse occurs at substantially the center of each half-bit period in the digital diphase signal. Since one complete cycle of carrier occurs per bit interval in the digital diphase signal, the necessary timing can be extracted from the zero-axis crossovers of the received data signal. To ensure proper timing, the data signal may be preceded by a few bit intervals corresponding to a "1" signal condition with the timing being thereafter maintained in response to the received data signal. By way of example, the timing circuit 38 may include a tank circuit responsive to the zero-axis crossovers and having a resonant frequency equal to twice the diphase data bit rate. In certain applications, a pilot or reference signal may be transmitted over the communication path in addition to the digital diphase signal for purposes of synchronization. In this case, the timing circuit 38 is made responsive to the additional reference signal, rather than as is shown in FIG. 3, to the digital diphase signal. The train of shift pulses generated by the timing circuit 38 is shown in the second waveform 66 of FIG. 4.

The received digital diphase signal 65 is fed to the set input terminal S and through the inverter 37 to the reset input terminal R of the first flip-flop 31 in the shift register 30. At the time that the first shift pulse 67 is applied from the timing circuit 38 to the trigger input terminal T of the first flip-flop 31 over lead 39, the level of the bit interval 76 in the received data signal 65 is high at the set input terminal S and low at the reset input terminal R of the first flip-flop 31. The first flip-flop 31 assumes its set condition. The output voltage appearing at the One output terminal of the first flip-flop 31 is shown in the waveform 68 of FIG. 4. The application of the shift pulse 67 to the trigger input terminal T of the first flip-flop 31 results in the voltage level at the One output terminal of the first flip-flop 31 becoming high as shown in waveform 68.

At the time of the next shift pulse 69 which occurs at the center of the second half of the first bit interval 76 in the received data signal, the received data signal is low at the set input terminal S and high at the reset input terminal R of the first flip-flop 31. As shown in waveform 68, the first flip-flop 31 assumes its reset condition with the One output terminal voltage low and the Zero output terminal voltage high. The shift pulse 69 also appears at the trigger input terminal T of the second flip-flop 32.

In the operation of the second flip-flop 32, as well as in the operation of the other flip-flops 31, 33, and 34 in the shift register 30, a delay is provided before a change in the condition of the inputs to the set and reset terminals, S and R respectively, of the flip-flop affects the response by the flip-flop to a shift pulse applied to the trigger input terminal T. As shown in the above-referenced General Electric publication, this delay is customarily provided by a diode-capacitance-resistance network in the input circuits of the flip-flop and is usually termed a CRD gate. The delay is sufficient to cause a change of voltage levels at the set and reset input terminals S and R to have no effect until after the termination of the shift pulse causing a change in the condition of the previous flip-flop. Since the first flip-flop 31 is in its set condition at the time of the shift pulse 69, the set input terminal S of the second flip-flop 32 is high. Because of the delay, the set input terminal S of the second flip-flop 32 remains high for the duration of the shift pulse. The application of the shift pulse 69 to the trigger input terminal T of the second flip-flop 32 triggers the second flip-flop 32 into its set condition. As shown in waveform 70 of FIG. 4, which represents the voltage level at the One output terminal of the second flip-flop 32, the voltage level at the One output terminal of the second flip-flop 32 becomes high.

When the next shift pulse 71 occurs, the received signal level is high at the set input terminal S of the first flip-flop 31 and low at the reset input terminal R of the first flip-flop 31, corresponding to the high level of first half of the second redefined bit interval 77. The first flip-flop 31 assumes its set condition, and the One output terminal of the first flip-flop 31 becomes high, waveform 68. The second flip-flop 32 is made to assume its reset condition as shown in waveform 70, reflecting the status of the first flip-flop 31 in its reset condition at the time of the shift pulse 71. The application of the shift pulse 71 to the third flip-flop 33 results in the third flip-flop 33 assuming its set condition due to the status of the second flip-flop 32 in its set condition at the time of the shift pulse 71. The voltage level at the One output terminal of the third flip-flop 33 represented by waveform 72 in FIG. 4 becomes high. It is assumed that, at the time of the shift pulse 71, the fourth flip-flop 34 will either be in or will be triggered into its reset condition, reflecting the low level of the received digital diphase signal 65 prior to the first complete bit interval 76 of the received signal. The voltage level at the One output terminal of the fourth flip-flop 34, which is shown in waveform 73 of FIG. 4, is low.

The pulse generator and delay circuit 54 is responsive to the shift pulses generated by the timing circuit 38 to produce a train of bit timing pulses. The pulse generator and delay circuit 54 may include by way of example, a monostable multivibrator circuit or any other suitable arrangement capable of generating an output pulse train bearing a given time relationship to a pulse train applied thereto. The bit timing pulses are timed to occur slightly after every other shift pulse and at the time when the samples B and C stored in the second and third flip-flops 32 and 33, respectively, correspond to a redefined bit interval in the received digital diphase signal 65. The bit timing pulses are shown in waveform 74 of FIG. 4.

A bit timing pulse 75 is shown in waveform 74 as occurring after the shift pulse 71. At the time of the bit timing pulse 75, the fourth flip-flop 34 is reset, indicating the low level of the received data signal 65 prior to the first complete bit interval 76 included in the received digital diphase signal. The third flip-flop 33 is set, indicating the high level of the received data signal 65 during the first half of the bit interval 76. The second flip-flop 32 is reset, indicating the low level of the received data signal 65 during the second half of the bit interval 76, and the first flip-flop 31 is set, indicating the high level of the received data signal 65 during the first half of the second bit interval 77 in the received data signal 65.

The bit timing pulse 75, therefore, occurs when the samples B and C in the flip-flops 32 and 33, respectively, correspond to the two-halves of the bit interval 76 in the received digital diphase signal. The sample A in the first flip-flop 31 corresponds to the level of the first half of the next bit interval 77, and the sample D in the fourth flip-flop 34 corresponds to the level of the received data signal 65 prior to the first bit interval 76. The status of the first and second flip-flops 31 and 32 defines whether a change in polarity has occurred at the beginning of the bit interval 77. The status of the third and fourth flip-flops 33 and 34 defines whether a change in polarity has occurred between the beginning of the bit interval 76 and the end of the next previous bit interval.

The bit timing pulse 75, waveform 74, is applied from the pulse generator and delay circuit 54 to the gate circuits 42, 45, 48, 51, 52, and 53. Each of the gate circuits 42, 45, 48, 51, 52, and 53 is arranged to produce an output pulse only when all of the respective inputs thereto are high. An examination of the waveforms 68, 70, 72, and 73 in FIG. 4 reveals that, at the time of the bit timing pulse 75, the input to the gate circuit 42 from the One output terminal of the second flip-flop 32, the input to the gate circuit 45 from the Zero output terminal of the first flip-flop 31, the input to the gate circuit 48 from the One output terminal of the fourth flip-flop 34, and the input to the gate circuit 51 from the Zero output terminal of the third flip-flop 33 are all low. The gate circuits 42, 45, 48, and 51 are all held non-responsive to the bit timing pulse 75. As indicated in waveform 78 of FIG. 4, no error pulse is produced at the error output terminal 56 via OR gate 55.

Also, upon the appearance of the bit timing pulse 75, the input to the gate circuit 52 from the One output terminal of the second flip-flop 32 and the input to the gate circuit 53 from the Zero output terminal of the third flip-flop 33 are both low. The gate circuits 52, 53 are held non-responsive to the bit timing pulse 75, and no output pulse appears at the data output terminal 58 via OR gate 57 as indicated in waveform 79 of FIG. 4. The absence of an output pulse at the output terminal 58 follows from the fact that the second and third flip-flops 32, 33 are in opposite conditions, indicating the occurrence of a change in polarity within the bit interval 76. Therefore, the absence of an output pulse at the data output terminal 58, waveform 79, indicates that the detected bit interval 76 represents a "0" signal condition. The absence of a pulse at the error output terminal 56, waveform 78, indicates that there has been a change in polarity at the beginning and end of the bit interval 76 and, therefore, that the condition of the bit interval 76 represented by the condition at the data output terminal 58 is correct.

The operation continues as described. The shift register 30 is operated by the shift pulses supplied by the timing generator 38 to sample the received digital diphase signal 65 at twice the data bit rate and to store the samples. The manner in which the status of the flip-flops 31, 32, 33, and 34 changes in response to the received data signal 65 can be followed by an examination of the waveforms 68, 70, 72, and 73, respectively.

Figure 4:
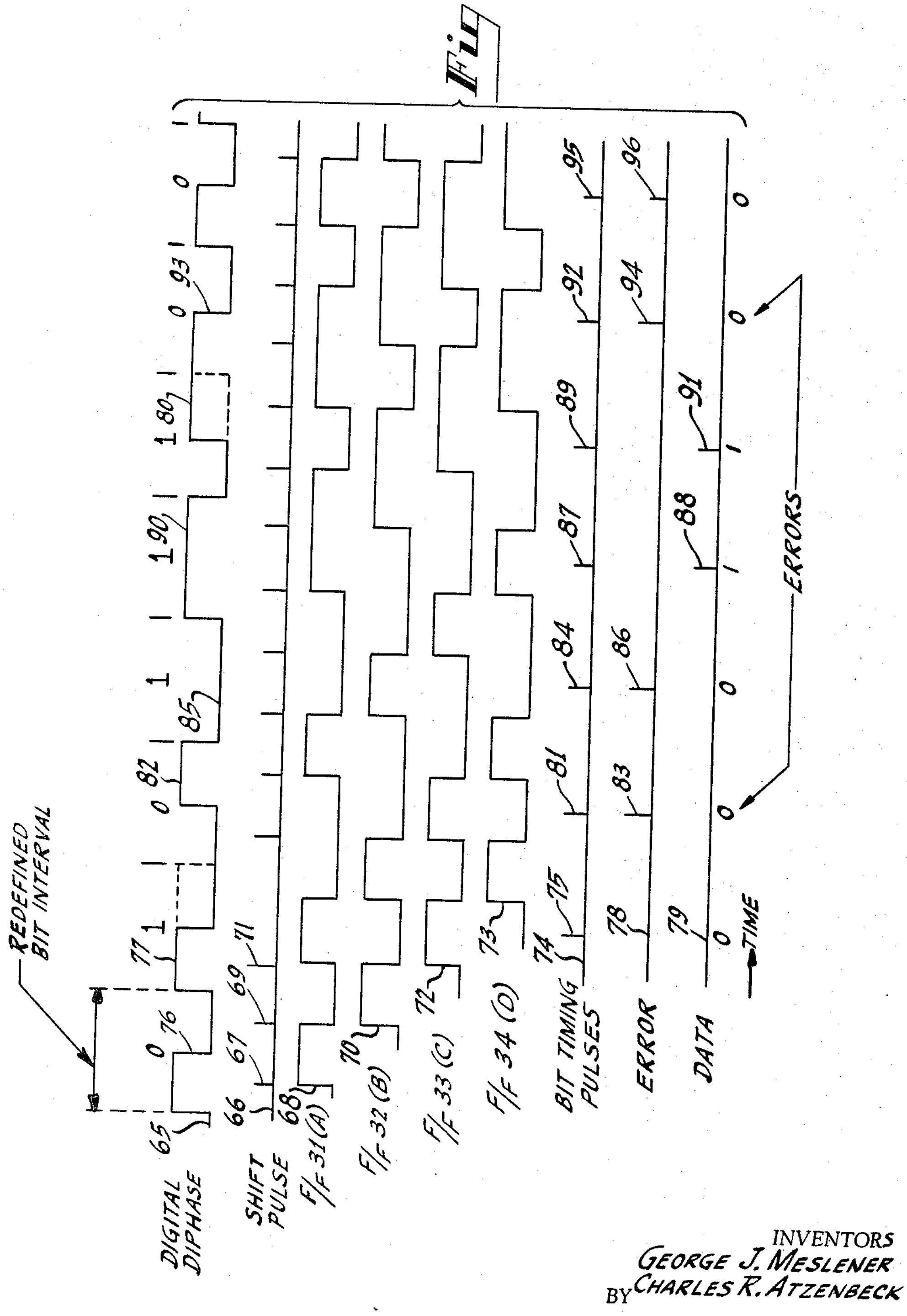
FIGURE 4 is a series orf waveforms useful in describing the operation of the embodiment shown in FIGURE 3.

At the time of the next bit timing pulse 81 shown in waveform 74 of FIG. 4, the first flip-flop 31 is reset, reflecting the low level of the first half of the third redefined bit interval 82. The second flip-flop 32 is reset corresponding to the low level of second half of the second redefined bit interval 77, and the third flip-flop 33 is set corresponding to the high level of the first half of the second redefined bit interval 77. The fourth flip-flop 34 is reset, reflecting the low level of the second half of the first redefined bit interval 76. Note that both the first and second flip-flops 31 and 32 are reset due to the absence of a change in polarity between the second and third bit intervals 77 and 82. The input to the gate circuit 45 from the Zero output terminal of the first flip-flop 31 via lead 43 and the input to the gate circuit 45 from the Zero output terminal of the second flip-flop 32 via lead 44 are both high at the time of the bit timing pulse 81. The gate circuit 45 produces an error pulse 83, waveform 78, which is applied to the error output terminal 56 via the OR gate 55. The gate circuits 42, 48 and 51 remain non-responsive to the bit timing pulse 81.

It is also to be noted that the second flip-flop 32 is reset while the third flip-flop 33 is set. A change in polarity has taken place in the center of the second redefined bit interval 77. A "0" signal condition for the second redefined bit interval 77 is indicated. The gate circuits 52 and 53 remain non-responsive to the bit timing pulse 81 with the absence of a pulse at the data output terminal 58, waveform 79, representing the receipt of the "0" signal condition. However, an error pulse 83 has been produced. The error pulse at the error output terminal 56 and the lack of a pulse at the data output terminal 58 thus sets forth the fact that, while the received redefined bit interval 77 appears to represent a "0" signal condition, the ends of the received bit interval 77 are not marked by a change in polarity. The signal condition of the received redefined bit interval 77 as represented at the data output terminal 58 is likely to be in error.

It has been assumed that a half-bit mutilation has taken place during the second half of the second redefined bit interval 77, resulting in the absence of a change in polarity between the second and third redefined bit intervals 77 and 82. The absence of the change in polarity would also result upon the occurrence of the half-bit mutilation during the first half of the third redefined bit interval 82. The signal distortion detection circuit is responsive only to the received digital diphase signal 65 and, therefore, must allow for the occurrence of either one of the two possible cases.

Upon the occurrence of the next bit timing pulse 84, the fourth flip-flop 34 is reset according to the low level of the second half of the second redefined bit interval 77. The third flip-flop 33 is reset according to the low level of the first half of the third redefined bit interval 82, and the second flip-flop 32 is set according to the high level of the second half of the third redefined bit interval 82. The first flip-flop 31 is reset according to the low level of the first half of the fourth redefined bit interval 85. The input to the gate circuit 51 from the Zero output terminal of the third flip-flop 33 via lead 49 and the input to the gate circuit 51 from the Zero output terminal of the fourth flip-flop 34 via lead 50 are both high. While the gate circuits 42, 45, and 48 remain non-responsive to the bit timing pulse 84, the gate circuit 51 is operated to apply an error output pulse 86 to the error output terminal 56 via OR gate 55.

Since the second flip-flop 32 is set and the third flip-flop 33 is reset, a change in polarity at the center of the third redefined bit interval 82 is indicated. The gate circuits 52 and 53 remain non-responsive to the bit timing pulse 84 and, as shown in waveform 79, no pulse appears at the data output terminal 58. While the absence of a pulse at the data output terminal 58 correctly indicates the third bit interval 82 as a "0" signal condition, the presence of the error output pulse 86 at the error output terminal 56 indicates that the signal condition represented at the data output terminal 58 is likely to be in error due to the absence of a change in polarity between the second and third redefined bit intervals 77 and 82. Since the signal distortion detection circuit without further information as to the signal originally transmitted must allow for the absence of a change in polarity between the second and third redefined bit intervals 77 and 82 due to the occurrence of a half-bit mutilation either at the end of the second redefined bit interval 77 or at the beginning of the third redefined bit interval 82, an error indication is provided for both the second and third bit intervals 77 and 82.

It is to be noted that even though an error indication is provided for the correctly received third redefined bit interval 82, the signal condition of the third redefined bit interval 82 is correctly presented at the data output terminal 58. The operation of the signal distortion detection circuit itself introduces no error in the intelligence recovered from the received digital diphase signal. As compared to the originally transmitted signal, an erroneous signal condition is presented at the data output terminal 58 only for each received redefined bit interval in which a half-bit mutilation has actually taken place.

The operation of the signal distortion detection circuit upon the appearance of the remaining bit timing pulses shown in waveform 74 of FIG. 4 follows from the above description. At the time of the next bit timing pulse 87, the fourth flip-flop 34 is set, the third flip-flop 33 is reset, the second flip-flop 32 is reset, and the first flip-flop 31 is set. The opposite states of the first and second flip-flops 31, 32 and the opposite states of the third and fourth flip-flops 33, 34 indicate that a change in polarity has taken place at both ends of the fourth redefined bit interval 85. The gate circuits 42, 45, 48 and 51 remain non-responsive to the bit timing pulse 87, and no error pulse appears at the error output terminal 56, waveform 78. The input to the gate circuit 53 from the zero output terminal of the second flip-flop 32 via lead 44 and the input to the gate circuit 53 from the zero output terminal of the third flip-flop 33 via lead 49 are both high. The gate circuit 53 produces an output pulse 88, waveform 79, which is forwarded to the data output terminal 58 via the OR gate 57. The fourth redefined bit interval 85 is presented at the data output terminal 58 as a "1" signal condition, the absence of an error pulse at the error output terminal 56 indicating that the signal condition presented at the data output terminal 58 is correct.

Upon the appearance of the next bit timing pulse 89, the gate circuits 42, 45, 58, and 51 again remain non-responsive, and no error pulse appears at the error output terminal 56, waveform 78. This is true since a change in polarity has occurred at both ends of the fifth redefined bit interval 90 as shown by the samples A, B, C, and D stored in the flip-flops 31, 32, 33, and 34. The input to the gate circuit 52 from the One output terminal of the second flip-flop 32 via lead 41 and the input to the gate circuit 52 from the One output terminal of the third flip-flop 33 via lead 46 are both high. An output pulse 91, waveform 79, is produced by the gate circuit 52 and applied to the data output terminal 58.

When the next bit timing pulse 92, waveform 74, occurs, the first flip-flop 31 and the second flip-flop 32 are both set, reflecting the absence of a change in polarity between the sixth redefined bit interval 80 and the seventh redefined bit interval 93. The input to the gate circuit 42 from the One output terminal of the first flip-flop 31 via lead 40 and the input to the gate circuit 42 from the One output terminal of the second flip-flop 32 are both high. The gate circuit 42 produces an error output pulse 94 at the error output terminal 56 via OR gate 55. Since the samples B and C stored in the second and third flip-flops 32 and 33, respectively, are of opposite conditions, a change in polarity at the center of the sixth redefined bit interval 80 is indicated. The gate circuits 52, 53 remain non-responsive to the bit timing pulse 92, and a "0" signal condition for the sixth redefined bit interval 80 is presented at the data output terminal 58, waveform 79. The simultaneous appearance of the error pulse 94 at the error output terminal 56 alerts the terminal equipment to the likelihood that the signal condition presented at the data output terminal 58 is in error.

The next bit timing pulse 95 results in the gate circuit 48 producing at the error output terminal 56 an error output pulse 96, waveform 78. The production of the error pulse 96 follows from the fact that a change in polarity is missing between the sixth redefined bit interval 80 and the seventh redefined bit interval 93, as well as the fact that it is not known within which one of the bit intervals 80 or 93 the half-bit mutilation occurred. The samples B and C stored in the second and third flip-flops 32 and 33, respectively, are of opposite condition so that the gate circuits 52 and 53 remain non-responsive to the bit timing pulse 95. A "0" signal condition is indicated for the seventh redefined bit interval 93 by the absence of a pulse at the data output terminal 58, waveform 79. While the "0" signal condition indicated at the data output terminal 58 for the seventh redefined bit interval 93 is, in fact, correct, the error pulse 96 simultaneously produced at the error output terminal 56 alerts the equipment responsive to the detected data signal to the absence of the change in polarity between the sixth and seventh redefined bit intervals 80 and 93. One or the other of the two bit intervals 80 and 93 is in error as shown by the appearance of the two error pulses 94 and 96 at the error output terminal 56.

While a particular digital diphase signal is shown in FIG. 4 and has been described in connection with the embodiment shown in FIG. 3, the operation of the signal distortion detection circuit is the same for any digital diphase signal including single half-bit mutilations. The error patterns may resemble any one of the error patterns shown in FIG. 2. In each case, the nature of a received bit interval is indicated by either the presence or absence of a pulse at the data output terminal 58. If the absence of a change in polarity between two succeeding bit intervals is detected, an error pulse is produced for the two bit intervals at the error output terminal 56. The possibility of an error in one or the other of the two bit intervals is indicated. In describing the embodiment shown in FIG. 3, reference has been made to a particular type of shift register. In practice, any circuit configuration capable of sampling an incoming signal at a desired rate and storing the samples for given time periods may be used.

It has been stated that the bit timing pulses generated by the pulse generator and delay circuit 54 must occur when the samples B and C stored in the second flip-flop 32 and the third flip-flop 33 correspond to the two halves of a bit interval in the received data signal. If the timing of the bit timing pulses slips so that, when the bit timing pulse appears, the sample B is the second half of one bit interval and the sample C is the first half of the following bit interval, each bit interval corresponding to a "1" signal condition received without mutiliation will give an error indication. The proper timing is assured by sending a series of continuous "1" signal conditions prior to the data signal. If the error indication is continuous, the timing of the bit timing pulses may be delayed one sample period to properly align the timing of the bit timing pulses. This may be done by monitoring the output signal at the error output terminal 56 and manually adjusting the timing of the pulse generator and delay circuit 54. On the other hand, suitable means may be provided for counting the error indications present at the error output terminal 56 in a given time period and automatically adjusting the timing of the pulse generator and delay circuit 54 when a given count is reached.

Any desired utilization circuit may be connected to the error output terminal 56 and to the data output terminal 58. The RZ (return-to-zero) data signal appearing at the data output terminal 58 as shown in waveform 79 of FIG. 4 may be fed to a multivibrator or other means for converting the signal into an NRZ (non-return-to-zero) data signal. The data signal appearing at the data output terminal 58 may be converted into any form desired.

Various error correction techniques may be employed with the signal distortion detection circuit of the invention. An ARQ or automatic request for repetition system arrangement may be provided. In such a system, the error pulses appearing at the error output terminal 56 are returned to the digital diphase signal generating means with the generating means being arranged to repeat that portion of the signal indicated by the error pulses.

Since errors in the received data signal caused by single half-bit mutilations are located with an ambiguity of two bits, a type of correction arrangement may be provided which determines which one of the two bits is incorrect and complements that one bit. By way of example, where the use of parity check bits in the digital diphase signal is possible, a given number of bits N are grouped to form a word and numbered sequentially from one to N. A parity restriction is placed on alternate bits, for example, the odd. When a half-bit mutilation occurs, the signal distortion and detecting circuit of the invention isolates the error to one of two bits, an odd and an even. Checking parity will determine which of the two bits is in error. If parity checks, the even bit is in error. If parity does not check, the odd bit is in error. The error is located and can be corrected by complementing. Any one of a number of possible correction techniques may be used with the invention, if desired, according to the needs of the particular application.

While the invention has been described in connection with a digital diphase signal, it is not limited for use with such a signal. The invention may be used in any differential phase shift keyed or other systems where it is possible to detect errors introduced in the transmitted signal by sensing the presence or absence of a change of polarity in the signal.

A signal distortion detection circuit is provided which operates directly from a received data signal. The use of the circuit requires no redundancy or increase of bandwidth in the data signal. It is not required that the received data signal first be demodulated nor is it required that the data bits be gathered into specific groups. It is possible, therefore, by using the invention to continually monitor the status of a transmission facility at either transmit or receive terminals or at any point between the transmit and receive terminals without the provision of data demodulating or grouping equipment. Also, no prior knowledge of the transmitted signal is needed to tell whether the transmission facility is noisy or poorly equalized or otherwise malfunctioning.

What is claimed is:

1. A circuit for detecting distortion in a signal including intelligence conveyed in time periods occurring at a given rate, a change in the polarity of said signal normally occurring between each succeeding one of said time periods regardless of the intelligence conveyed in said time periods, said circuit comprising, in combination, means for storing said signal and for storing a delayed replica of said signal, means for sampling said signal and said delay replica at a rate equal to at least twice said given rate, and means for examining said samples of said signal and of said replica for a pattern which indicates the absence of said change in polarity between succeeding ones of said time periods and for producing an output signal when said pattern is recognized.

2. In combination, input means adapted to receive a data signal including intelligence conveyed in equal length time periods occurring at a given rate, a change in the polarity of said signal normally occurring between each succeeding ones of said time periods regardless of the intelligence conveyed in said time periods, means for sampling said signal at a rate equal to twice said given rate and for storing said samples, means for comparing the polarity of said samples corresponding to said signal in successive ones of said time periods, and means connected to said comparing means to provide an output signal each time said change in polarity is removed from between succeeding ones of said time periods.

3. A circuit for detecting single half-bit mutilations in a digital diphase signal including serially appearing bit intervals each representing either one of two conditions, the bit intervals representing one of said conditions each being formed by a reversal in the phase of said signal at the center of the bit interval with the bit intervals representing said second condition each being formed by the absence of a reversal in the phase of said signal at the center of the bit interval, a change in the polarity of said signal normally occurring between each succeeding ones of said bit intervals regardless of the conditions represented by said bit intervals, said circuit comprising, means to determine the polarity of said signal at the last half of a bit interval, means to determine the polarity of said signal at the first half of the next succeeding bit interval, and means responsive to said polarity determining means for detecting the absence of a change in polarity between succeeding ones of said bit intervals and for producing an output signal each time said absence is detected.

4. A circuit for detecting distortion in a phase shift keyed data signal including bit intervals each representing either one of two conditions, the bit intervals representing one of said conditions being formed by a reversal in the phase of said signal with the other of said bit intervals representing said second condition being formed by the absence of a reversal in the phase of said signal, each of said bit intervals being normally separated from the succeeding bit interval in said signal by a change in the polarity of said signal regardless of the conditions represented by said bit intervals, said circuit comprising, in combination, means for determining the polarity of a portion of a bit interval and for storing said determination, means for determining the polarity of a portion of an adjacent bit interval, and means for examining said determinations for a pattern which indicates that said change in polarity is missing between succeeding ones of said bit intervals and for producing an output signal when said pattern is recognized.

5. In combination, input means adapted to receive a signal including intelligence conveyed in time periods occurring at a given rate with a change in the polarity of said signal normally occurring between each succeeding ones of said time periods regardless of the intelligence conveyed in said time periods, means for sampling said signal at a rate equal to at least twice said given rate and for storing said samples, means responsive to said stored samples for producing a first output signal representative of said intelligence conveyed in said time periods, and means also responsive to said stored samples for detecting the absence of said change in polarity between succeeding ones of said time periods and for producing a second output signal including an indication of the particular time periods between which said change in polarity is found to be absent.

6. A circuit for detecting distortion in a signal including intelligence conveyed in time periods occurring at a given rate with a change in the polarity of said signal normally occurring between each succeeding ones of said time periods regardless of the intelligence conveyed in said time periods, said circuit comprising, in combination, means for sampling said signal at a rate equal to at least twice said given rate and for storing said samples, first and second output terminals, means responsive to said stored samples for producing at said first output terminal an indication of said intelligence conveyed in each of said time periods, and means also responsive to said stored samples for detecting the absence of said change in polarity between succeeding ones of said time periods and for producing at said second output terminal simultaneously with the appearance at said first output terminal of the indication of the intelligence conveyed in a time period a further indication as to whether a change in polarity occurs between that time period and the adjacent ones of said time periods in said signal.

7. A circuit for detecting single half-bit mutilations in a digital diphase data signal including serially-appearing bit intervals each representing either one of two conditions, the bit intervals representing one of said conditions each being formed by a reversal in the phase of said signal at the center of the bit interval with the bit intervals representing said second condition each being formed by the absence of a reversal in the phase of said signal at the center of the bit interval, a change in the polarity of said signal normally occurring between each succeeding ones of said bit intervals regardless of the conditions represented by said bit intervals, said circuit comprising, in combination, means for sampling said signal at a rate equal to twice the bit interval rate in said signal and for storing said samples, first and second output terminals, means responsive to said stored samples for producing at said first output terminal an indication of the condition represented by each of said bit intervals, and means also responsive to said stored samples for detecting the absence of said change in polarity between succeeding ones of said bit intervals and for producing at said second output terminal simultaneously with the appearance at said first output terminal of one of said indications a further indication as to whether a change in polarity occurs between the bit interval corresponding to said one indication and the adjacent ones of said bit intervals in said signal.

8. A circuit for detecting distortion in a data signal including intelligence conveyed in time periods occurring at a given rate, a change in the polarity of said signal normally occurring between each succeeding ones of said time periods regardless of the intelligence conveyed in said time periods, said circuit comprising, in combination, a shift register, means for storing in said shift register at least two replicas of said signal, one of said replicas being delayed half a time period with respect to the other thereof, means for operating said shift register to sample said replicas at a rate equal to at least twice said given rate and a gating circuit coupled to said shift register and operated to examine said samples for a pattern which indicates the absence of said change in polarity between succeeding ones of said time periods and to produce an output signal when said pattern is recognized.

9. A circuit for detecting distortion in a phase shift keyed data signal including bit intervals each representing either one of two conditions, the bit intervals representing one of said conditions being formed by a reversal in the phase of said signal with the other of said bit intervals representing said second condition being formed by the absence of a reversal in the phase of said signal, each of said bit intervals being normally separated from the succeeding bit interval in said signal by a change in the polarity of said signal regardless of the conditions represented by said bit intervals, said circuit comprising, in combination, a shift register, means for storing a replica of said signal and a delayed replica of said signal in said shift register, said delay being equal to one-half a bit interval, means for operating said shift register to sample said replicas with at least one sample being produced for each half-bit interval in said signal, and a gating circuit coupled to said shift register and operated to examine said samples for a pattern which indicates that said change in polarity is missing between succeeding ones of said bit intervals and to produce an output signal when said pattern is recognized.

10. In combination, input means adapted to receive a data signal including intelligence conveyed in equal length bit intervals occurring at a given rate, a change in the polarity of said signal normally occurring between each succeeding ones of said bit intervals regardless of the intelligence conveyed in said time periods, a shift register, means for operating said shift register to sample said signal at a rate equal to twice said given rate and to store said samples, first and second output terminals, a first gating means coupled to said shift register and operated to produce at said first output terminal an indication of the intelligence conveyed in each of said bit intervals, and a second gating means coupled to said shift register and operated to examine said stored samples for a pattern which indicates the absence of a change in polarity between succeeding bit intervals in said signal and to produce an indication at said second output terminal when said pattern is recognized.

11. A circuit for detecting distortion in a data signal including intelligence conveyed in bit intervals occurring at a given rate, a change in the polarity of said signal normally occurring between each succeeding ones of said bit intervals regardless of the intelligence conveyed in said bit intervals, said circuit comprising, in combination, a shift register having a plurality of output terminals, means for operating said register to produce at said output terminals samples of said signal with at least one sample being produced for each half-bit interval in said signal, a gating circuit having a plurality of input terminals connected to said output terminals, and means for operating said gating circuit at times between said signal sampling times to examine said samples at said output terminals for a pattern which indicates the absence of a change in polarity between succeeding ones of said bit intervals and to produce an output signal when said pattern is recognized.

12. A circuit for detecting distortion in a phase shift keyed data signal including bit intervals each reprsenting either one of two conditions, the bit intervals representing one of said conditions being formed by a reversal in the phase of said signal with the other of said bit intervals representing said second condition being formed by the absence of a reversal in the phase of said signal, each of said bit intervals being normally separated from the succeeding bit interval in said signal by a change in the polarity of said signal regardless of the conditions represented by said bit intervals, said circuit comprising, in combination, a shift register including a plurality of flip-flops each capable of assuming either one of two stable states, means for operating said register to sample said signal at a rate equal to twice the rate of said bit intervals in said signal and to store said samples in the states assumed by said flip-flops, and a gating circuit connected to said flip-flops and operated between said signal sampling times to examine the states of said flip-flops for a pattern which indicates the absence of a change in polarity between succeeding bit intervals in said signal and to produce an output signal when said pattern occurs.

13. A circuit for detecting single half-bit mutilations in a digital diphase signal including serially-appearing bit intervals each representing either one of two conditions, the bit intervals representing one of said conditions each being formed by a reversal in the phase of said signal at the center of the bit interval with the bit intervals representing said second condition each being formed by the absence of a reversal in the phase of said signal at the center of the bit interval, a change in the polarity of said signal normally occurring between each succeeding ones of said bit intervals regardless of the conditions represented by said bit intervals, said circuit comprising, in combination, a shift register including four flip-flops each capable of assuming either of two stable states, means for operating said shift register to sample said signal at a rate equal to twice the rate of said bit intervals in said signal and to store said samples in the states assumed by said flip-flops, a gating circuit connected to said flip-flops, and means for operating said gating circuit at times between said signal sampling times and when the samples stored in the two center ones of said flip-flops in said register correspond to the two halves of a bit interval in said signal to examine the states of said flip-flops for a pattern which indicates that said change in polarity is missing between succeeding ones of said bit intervals, said gating circuit being operated by said last-mentioned means to produce an output signal when said pattern is recognized.

14. A circuit for detecting single half-bit mutilations in a digital diphase signal including bit intervals each representing either one of two conditions, the bit intervals representing one of said conditions each being formed by a reversal in the phase of said signal at the center of the bit interval with the bit intervals representing said second condition each being formed by the absence of a reversal in the phase of said signal at the center of the bit interval, a change in the polarity of said signal occurring between each succeeding ones of said bit intervals regardless of the conditions represented by said bit intervals, said circuit comprising, in combination, a shift register including four flip-flops each capable of assuming either one of two stable states, means for operating said register to sample said signal at a rate equal to twice the bit interval rate in said signal and to store said samples in the states assumed by said flip-flops, first and second output terminals, a gating means operated at given times between said signal sampling times to examine the samples stored in the two flip-flops at the middle of said register and to produce at said first output terminal an indication of the condition represented by each of said bit intervals, said gating means also being operated at said given times to examine the samples stored in said four flip-flops for a pattern which indicates the absence of a change in polarity between succeeding bit intervals in said signal and to produce an indication at said second output terminal when said pattern is recognized.

15. A circuit for detecting distortion in a phase shift keyed signal including bit intervals each representing either one of two conditions, the bit intervals representing one of said conditions being formed by a reversal in the phase of said signal with the other of said bit intervals representing said second condition being formed by the absence of a reversal in the phase of said signal, each of said bit intervals being normally separated from the succeeding bit interval in said signal by a change in the polarity of said signal regardless of the conditions represented by said bit intervals, said circuit comprising, in combination, first, second, third and fourth flip-flops each capable of assuming either one of two stable states, means connecting said flip-flops to form a shift register with said first flip-flop at one end of said register and said fourth flip-flop at the other end of said register, means to apply said signal to said first flip-flop in said register, means for operating said register to sample said signal and to store said samples in the states assumed by said flip-flops with a sample being produced and stored for each half-bit interval in said signal, a gating circuit connected to said flip-flops, and means for operating said gating circuit at times between said signal sampling times and when the samples stored in said second and said third flip-flops correspond to the two halves of a bit interval in said signal to examine the samples stored in said first, second, third and fourth flip-flops for a pattern which indicates that said change in polarity is missing between succeeding ones of said bit intervals in said signal, said gating circuit being operated by said last-mentioned means to produce an output signal when said pattern is recognized.

16. A circuit for detecting single half-bit mutilations in a digital diphase signal including bit intervals each representing either one of two conditions, the bit intervals representing one of said conditions each being formed by a reversal in the phase of said signal at the center of the bit interval with the bit intervals representing said second condition each being formed by the absence of a reversal in the phase of said signal at the center of the bit interval, a change in the polarity of said signal occurring between each succeeding ones of said bit intervals regardless of the conditions represented by said bit intervals, said circuit comprising, in combination, first, second, third and fourth flip-flops each capable of assuming either one of two stable states, means connecting said flip-flops to form a shift register with said first flip-flop at one end of said register and said fourth flip-flop at the other end of said register, means to apply said signal to said first flip-flop in said register, means for operating said register to sample said signal and to store said samples in the states assumed by said flip-flops with a sample being produced and stored for each half-bit interval in said signal, first and second output terminals, a first gating circuit connected to said second and said third flip-flops, means for operating said first gating circuit at given times between said signal sampling times and when the samples stored in said second and third flip-flops correspond to the two halves of a bit interval in said signal to produce at said first output terminal an indication of the condition represented by each of of said bit intervals, a second gating circuit connected to said first, second, third and fourth flip-flops, said second gating circuit being operated at said given times by said last-mentioned means to examine said samples stored in said first, second, third and fourth flip-flops for a pattern which indicates the absence of said change in polarity between the bit interval corresponding to the samples stored in said second and third flip-flops and the adjacent ones of said bit intervals in said signal and to produce an indication at said second output terminal when said pattern is recognized.

References Cited

UNITED STATES PATENTS

| | | | |
|---|---|---|---|
| 3,078,344 | 2/1963 | Crafts et al. | 178—88 |
| 3,119,964 | 1/1964 | Crafts | 325—30 |
| 3,222,454 | 12/1965 | Losee | 178—88 |
| 3,234,330 | 2/1966 | Lee | 178—67 |

JOHN W. CALDWELL, *Acting Primary Examiner.*

MALCOLM A. MORRISON, *Examiner.*

M. PALLEN, J. T. STRATMAN, *Assistant Examiners.*